United States Patent [19]

Beausoleil et al.

[11] 3,789,247

[45] Jan. 29, 1974

[54] DYNAMICALLY ORDERED BIDIRECTIONAL SHIFT REGISTER HAVING CHARGE COUPLED DEVICES

[75] Inventors: William F. Beausoleil, Hopewell Junction; Irving T. Ho, Poughkeepsie; Hwa Nien Yu, Yorktown Heights, all of N.Y.

[73] Assignee: International Business Machines Corporation, Armonk, N.Y.

[22] Filed: July 3, 1972

[21] Appl. No.: 268,342

[52] U.S. Cl.......... 307/304, 307/221 C, 340/173 SR

[51] Int. Cl. ............................................ H01l 11/14

[58] Field of Search.. 317/235.6; 307/221 R, 221 C, 307/304; 328/37; 340/173 SR

[56] References Cited

UNITED STATES PATENTS 3,670,313 6/1972 Beausoleil et al............ 340/174 TF

OTHER PUBLICATIONS

Electronics, "The New Concept for Memory and Imaging:" Charge Coupling June 21, 1971 pages 50–59

*Primary Examiner*—Jerry D. Craig
*Attorney, Agent, or Firm*—Theodore E. Galanthay

[57] ABSTRACT

The specification describes charge coupled devices in a bidirectional shift register and having a dynamic ordering capability. Charge coupled devices are shown in a semiconductor structure with FET amplifying circuits, uniquely adapted for bidirectional operation by means of a circuit which changes the order of occurrence of the clocking pulses. The density of charge coupled devices is preserved together with improved access time resulting from bidirectional operation and dynamic ordering.

6 Claims, 14 Drawing Figures

DYNAMICALLY ORDERED BIDIRECTIONAL SHIFT REGISTER HAVING CHARGE COUPLED DEVICES

CROSS REFERENCE TO RELATED APPLICATIONS AND PATENTS

1. U. S. Pat. No. 3,670,313, issued June 13, 1972, inventors: W. F. Beausoleil et al and commonly assigned with the present application.

2. Application Ser. No. 103,201 filed Dec. 31, 1970, now U. S. Pat. No. 3,704,452 inventors W. F. Beausoleil et al, and commonly assigned with the present application.

BACKGROUND OF THE INVENTION

1. Field of the Invention

This invention relates to a dynamically ordered bidirectional shift register and more specifically to such a shift register having charge coupled devices.

2. Description of the Prior Art

Dynamic ordering for bubble domain devices was previously described in the cross referenced patent applications. Dynamic ordering broadly relates to improving the access time of a shift register by assigning a higher priority to certain of the shift register locations. High priority data may then be transferred from a very long shift register to a shorter one for quicker access.

Dynamic shift registers constructed from semiconductors are generally uni-directional. This directivity is either provided by devices such as bipolar dynamic shift registers, bipolar bucket brigade, or by FET dynamic shift register or FET bucket brigade. Although these shift registers can be designed to function bidirectionally, as exemplified by Yao, U. S. Pat. No. 3,609,393, additional devices or additional interconnections or both, must be added to the original basic form, increasing power supply demands and decreasing packaging density.

In a hierarchy of data storage in electronic computer systems, shift registers generally have slower access times than a random access memory; but shift registers have the advantage of higher packaging density. Charge coupled device (CCD) shift registers are particularly adapted to high density packaging. The prior art, however, lacks a teaching for preserving high density packaging in combination with means, such as dynamic ordering, for significantly improving access times.

SUMMARY OF THE INVENTION

It is accordingly an object of this invention to provide an improved high density bidirectional dynamic shift register.

It is another object of this invention to provide such a shift register having a dynamic ordering capability.

It is still another object of this invention to provide such a shift register constructed from charge coupled devices (CCD).

It is a still further object of this invention to provide a bidirectional dynamic shift register combining the advantages of charge coupled devices and dynamic ordering, without degrading the packaging density of charge coupled devices (CCD).

The foregoing and other objects, features and advantages of this invention will be apparent from the following more particular description of preferred embodiments of the invention, as illustrated in the accompanying drawings.

GENERAL DESCRIPTION

Figure 1:
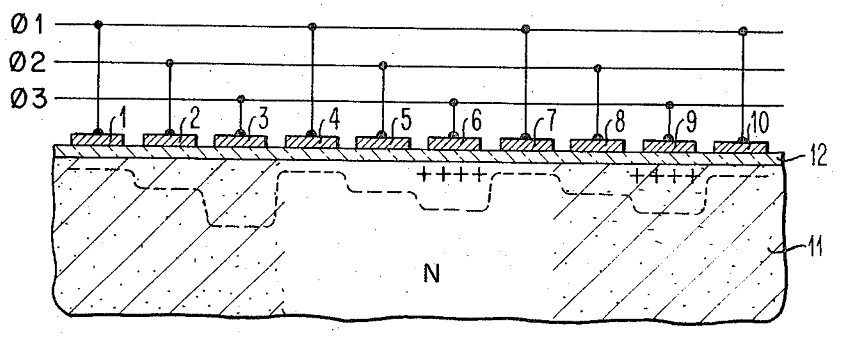
FIG. 1 is a section of a shift register having charge coupled devices.

Refer now to FIG. 1 which shows a section of the shift register of the present invention, having charge coupled devices (CCD). CCD devices and the use of CCD devices to construct shift registers has been previously disclosed. For example, see the Digest of Technical Papers of the 1971 IEEE International Solid-State Circuits Conference, Session XIII, dated Feb. 19, 1971, pages 158–167. For P channel devices, the semiconductor substrate 11 comprising silicon, for example, is doped with an N type impurity. The substrate is covered with a thin layer of dielectric material such as silicon dioxide ($SiO_2$) in the order of approximately 1,000. A. in thickness. This layer has been designated by reference numeral 12. Conductive material such as aluminum electrodes are then deposited over the thin silicon dioxide layer. These aluminum electrodes have been numbered in sequence 1–10. Each of these electrodes is connected to one of a plurality of phase lines.

Figure 2:
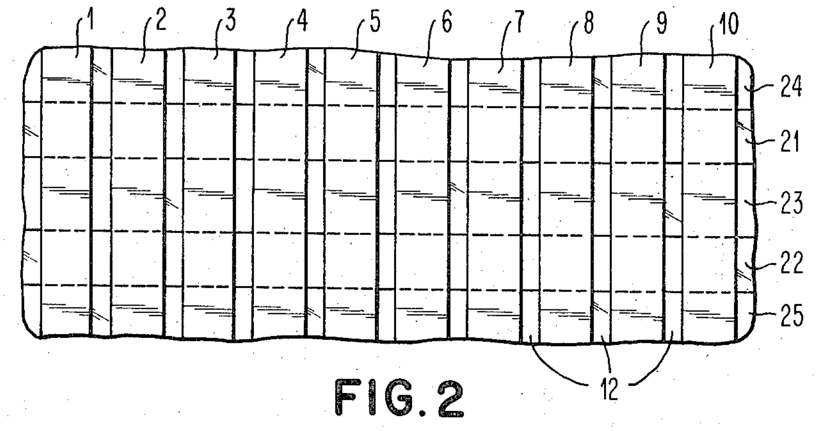
FIG. 2 is a section of a top view of the shift register of FIG. 1.

As shown in the top view of FIG. 2, the aluminum conductors are placed in rows, with insulating gaps therebetween so that an entire word of information is shifted in the shift register, rather than just a single bit. Channels 21 and 22 shown horizontally in the top view of FIG. 2 have thin oxide 12 under the aluminum electrodes. Between alternate channels of thin silicon oxide there are channels 23, 24, and 25 having a much thicker layer of silicon dioxide. Accordingly, no charge is coupled through the thicker oxide layer, thereby isolating the various bits in a shift register word.

As information is shifted in a large CCD shift register, it must be periodically regenerated (amplified). For this reason, amplifying circuits comprising field effect transistors are formed into the substrate with the CCD devices. Such a structural arrangement is partially shown in FIG. 4. The substrate 11 and thin silicon dioxide layer 12 as well as aluminum electrodes are shown similar to FIG. 1. However, additional diffusions of P+ impurity type are required for the forming of the regenerating-amplifying circuit. Two of these diffusions designated D1 and D2 are shown together with a thickened oxide and additional aluminum electrodes. The section is shown with broken lines because the remainder of the diffusions required to form the circuit of FIG. 5 are an obvious expedient to those skilled in the art once the circuit of FIG. 5 has been specified.

Figure 5:
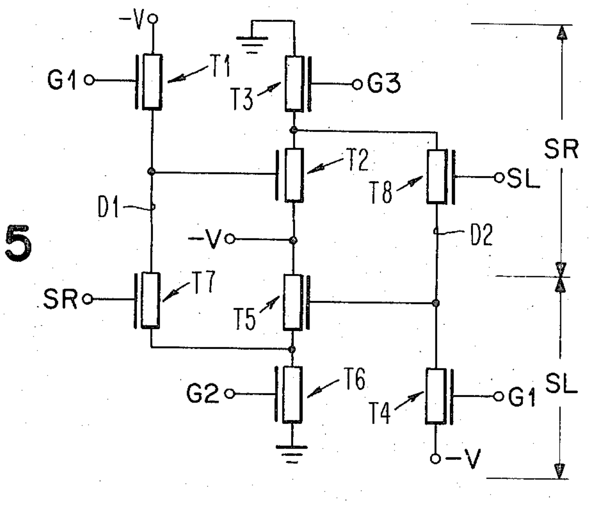
FIG. 5 is a circuit diagram of a regenerating-amplifying stage.

The circuit of FIG. 5 comprises P channel FETs in order to be compatible with the remainder of the CCD shift register. The circuit of FIG. 5 must also be bidirectional just as the remainder of the shift register circuit, as one of the salient features of the present invention. Note also that the field effect transistors T1-T8 are symmetrical, each having two gated electrodes and one gating electrode. One of the gated electrodes is usually designated as the drain while the other gated electrode is designated as the source. Since these transistors are symmetrical, the designation of source and drain is somewhat arbitrary. Therefore, the diffusion D1 serves simultaneously as the source of T1 and the drain of T7. The drain of T1 is connected to a negative source of potential —V, while the source of T6 is connected to ground. The gating electrode of T1 is connected to a source of pulses G1 while the gating electrode of T6 is connected to a source of gating pulses G2, to be described in greater detail later herein. The drain of T8 and the source of T4 are formed by diffusion D2. The source of T3 is connected to ground potential while the drain of T4 is connected to the negative source of potential —V. The drain of T2 and the drain of T5 are connected to the negative source of potential —V. The gating electrode of T2 is connected to the diffusion D1 while the gating electrode of T5 is connected to the diffusion D2. The gating electrodes of T3 and T4 are connected to source of pulses G3 and G1 respectively, to be described in greater detail later herein. Note that only the interfacing diffusions D1 and D2 are shown since diffusions such as the one forming the drain of T2 and the drain of T5 are internal to the FET circuit and well known to those skilled in the art. A common diffusion forms the drain of T6 and the source of T5 and T7. Also, a common diffusion forms the drain of T3 and the source of T2 and T8. Note also that the circuit of FIG. 5 is completely symmetrical and operable in the bidirectional mode designated by shift right (SR) and shift left (SL). The designations SR and SL have been maintained compatible with the nomenclature of FIGS. 3A and 6A. Note that in the description of FIGS. 3A and 6A, positive logic is shown, so that gating is performed by up level pulses. In the P channel FET circuit of FIG. 5, gating is performed by down level potential, while up level potentials, being at ground level, block conduction. It is also known that the SR and SL pulses are always out of phase. For this reason, the SR pulse at the gate of T7 indicates an up level pulse keeping T7 off when it is desired to shift right. Similarly, the up level SL signal at the gate of T8 keeps T8 off when it is desired to shift left.

Figure 3:
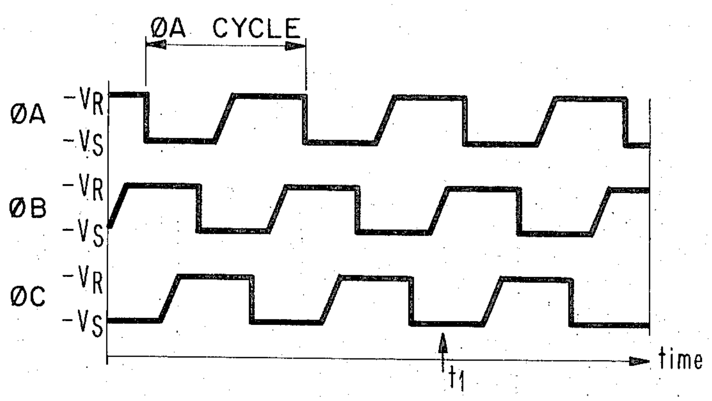
FIG. 3 is a waveform diagram descriptive of the operation of the shift register of FIGS. 1 and 2.
Figure 3A:
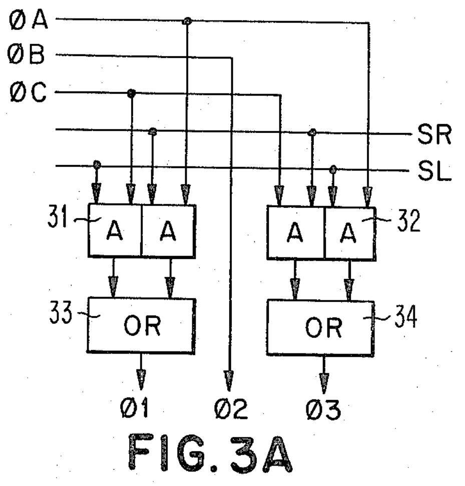
FIG. 3A is a circuit diagram relating the waveform diagram of FIG. 3 to the operation of the shift register of FIGS. 1 and 2.

Refer now to FIG. 3A which shows an exemplary circuit for swapping of clock lines in order to operate the shift register of FIGS. 1 and 2 bidirectionally in accordance with the waveforms of FIGI 3. The clock phase altering circuit is shown including AND circuits 31 and 32, and OR circuits 33 and 34. Since a three phase shift register is disclosed, at least two of the three phases designated as phase A, phase B and phase C provide inputs to AND circuits 31 and 32. A third phase line, phase B in the present example, is shown as a straight through connection leaving the timing of phase 2 unaltered. The outputs of the AND circuits are supplied to the inputs of the OR circuits, as shown, providing as outputs phase 1 and phase 3. As will be described in greater detail later herein, the clock positions of the phase 1 and phase 3 lines are reversed by the circuit of FIG. 3A. The direction of shift register operation which depends on the order of occurrence of the phase 1 and phase 3 clock pulses is determined by the up level of the shift right (SR) or shift left (SL) control line.

Figure 6:
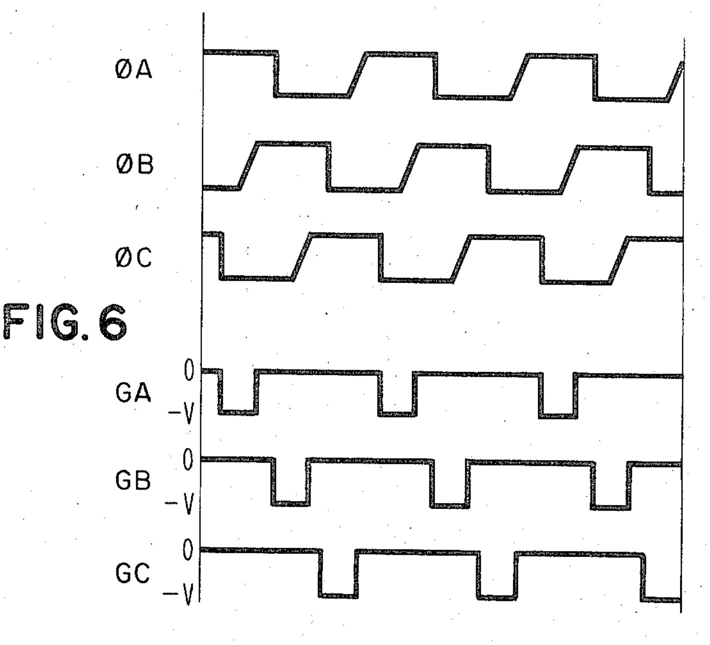
FIG. 6 is a waveform diagram depicting one mode of operation of the circuit of FIG. 5.
Figure 6A:
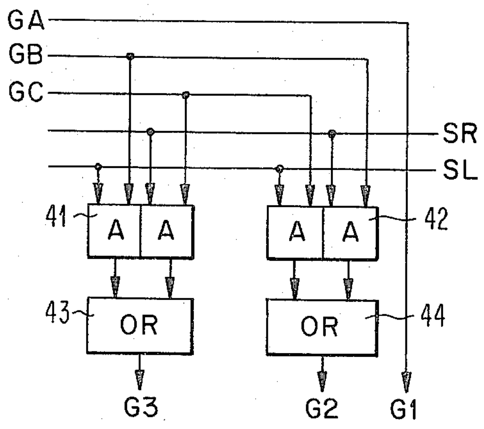
FIG. 6A is a circuit diagram relating the operation of the circuit of FIG. 5 to the waveform diagram of FIG. 6.

Refer now to FIG. 6a which provides the phase pulses required for the bidirectional capability of the amplifying circuit of FIG. 5. Again, at least two of the clock inputs designated as GB and GC are provided as inputs to AND circuits 41 and 42. The third clock line input designated as GA is shown as a straight through connection for gating pulse G1. The outputs of AND circuits 41 and 42 are received as inputs by OR circuits 43 and 44, respectively, providing output gating pulses G3 and G2, respectively. In this case, the shift right (SR) and shift left (SL) are provided as inputs to the AND circuit to provide the proper order of the G3 and G2 gating pulses. Note that, as will be described in the operation of the present circuit, such phase reversal is obtainable by the appropriate interchanging of any two of the three input clock pulses to provide output pulses in the desired order to obtain the desired direction of operation.

A memory consisting of a shift register system having many long shift registers operating in unison has, in common with rotating mechanical storage devices, a relatively long storage access time if the data contained therein were assigned permanent addresses. CCD registers differ from a rotating mechanical device in that shifting (which corresponds to rotation) can be stopped and started almost instantaneously, and in accordance with the present invention, the shifting direction of CCD shift register can be reversed by changing the sequence of clock pulses. This bidirectional shifting ability is exploited in the dynamic ordering technique.

It is well known that the addresses referred to during program execution are not random, but that each address has a greater likelihood of being in the same locality as those recently referred to. This fact makes feasible memory hierarchies, such as those in more sophisticated computer systems. In these systems, a small, fast cache or buffer contains recently used data. The processor refers to the cache or buffer, and if the term requested is not present, a small block of data that includes the desired item is brought in from a slower main memory. The block replaces a block already in the cache or buffer, which is typically chosen to be one not recently used. Due to the locality-of-reference principle, the fraction of items not found in the cache is small, and good performance is achieved.

A dynamically ordered CCD shift register system also relies on the locality-of-reference principle to achieve good performance. As noted, the CCD shift register system consists of many registers shifting in unison. A page of data is comprised of any number of desired bits from the corresponding position in each data shift register. In addition to the data shift registers, identical registers contain the address of each page. (Bytes within a page have sequential addresses, and the page size is a power of two, so that all byte addresses in a page have common high order bits that define a unique page address.) The addresses shift with the pages, making every page self-labeled and removing the requirement of any predefined page order. By decoupling the page currently referred to from the shift registers and reverse-shifting, the pages are continually reordered. Recently referred to pages stay near the I/O position (i.e., the position from which a page can be read or written into).

Figure 4:
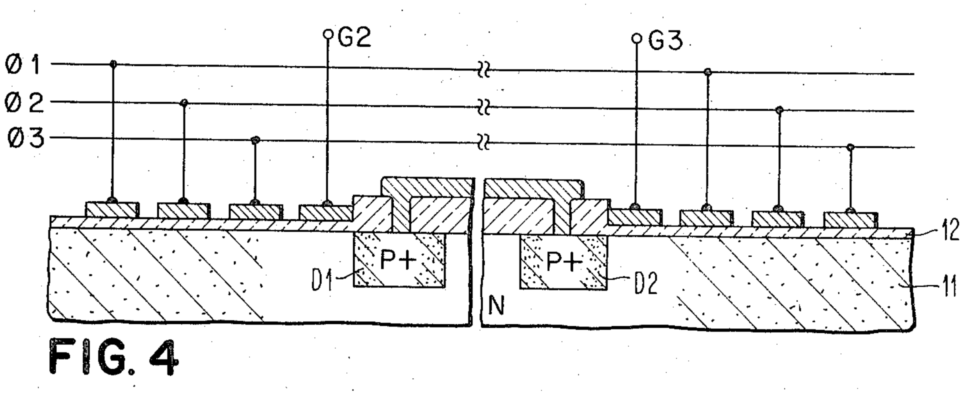
FIG. 4 is a section of shift register having a section of a regenerating-amplifying stage.
Figure 7A:
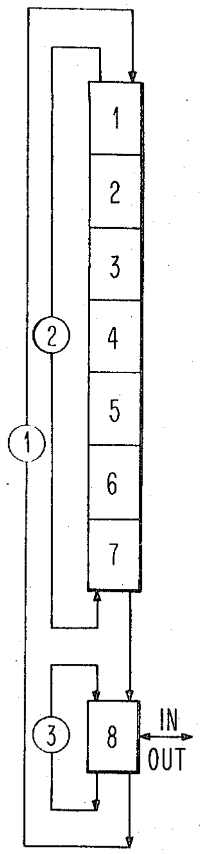
FIGS. 7A, 7B, 7C, 7D, 7E, and 7F are shift registers.

Refer now to FIG. 7A which represents a protion of a shift register system. The shift register shown in FIG.7A is shown with only eight blocks, for purposes of illustration. In practice, any number such as thousands of such blocks are intended. Each of these eight blocks include a plurality of serial stages, i.e., bit positions. As previously described, in the presently disclosed three phase CCD shift register, each bit position utilizes three serial CCD devices. Amplifying meas of the type disclosed in FIGS. 4 and 5 are required for periodic amplification (regeneration) of the bit stream. For convenience, these amplifiers are placed at the "boundary" of the various blocks. Assuming, for purposes of example, that the CCD shift register described herein requires regeneration every 32 bits, then each block contains 32 serial stages of shift register. (For purposes of simplifying the present description, the bits or fractions of bits stored in the amplifying circuit are neglected.) Also not shown are the specific gating means for gating the bit stream into the shifting loops designated by the circled numbers 1, 2, and 3. The circulating of a shift register in a desired loop is well known in the art. In the present example, the lower boundary of block 7, as well as all other boundaries shown have FET amplifying circuits of the type shown in FIG. 5. Those skilled in the art can readily gate the output of the amplifying circuit on the desired one of a plurality of conductive lines. For greater detail, refer to the cross-referenced patent applications. With continued reference to FIG. 7A, note that specifically a single bit stream is described. It should be understood that it is intended for a large number of such shift registers to be in parallel, simultaneously shifting a large number of bits numbering in the thousands, for example. In the previous description of FIG. 2, it was shown how a number of such bit streams are shifted in parallel. Assuming that 1K bits are moved in parallel, and that each block contains 32 serial bits, then 32K bits are stored in a single block. So long as information is repeatedly required from the same block before another block must be accessed, the full size of the complete shift register system is relatively negligible.

OPERATION

Figure 7B:
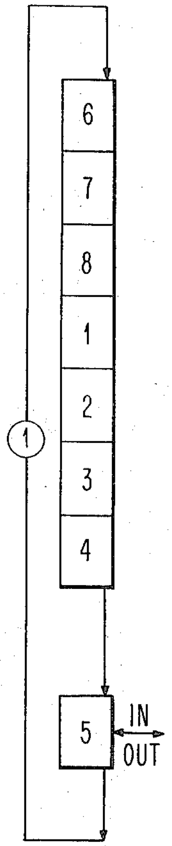
Figure 7C:
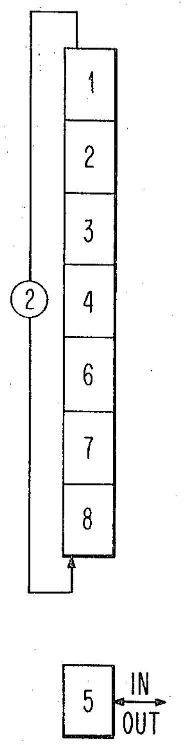
Figure 7D:
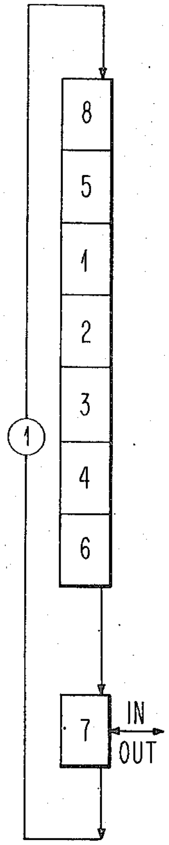
Figure 7E:
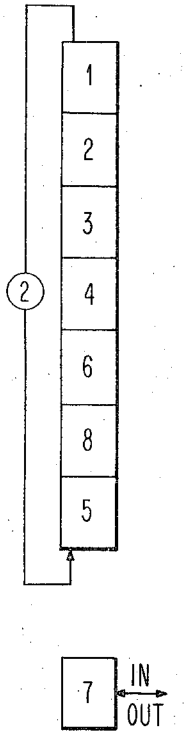
Figure 7F:
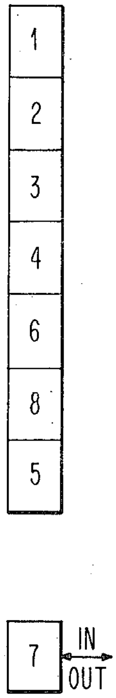

Having described the general structural arrangement of the present invention together with the previously disclosed concepts of dynamic ordering, refer now to FIGS. 7A and 7F for the overall operation of the shift register storage system of the present invention. In accordance with the present invention, the basic concept of dynamic ordering is combined with the advantages of a high density CCD bidirectional dynamic shift register.

In FIG. 7A, the blocks (also shown as pages) in the shift register are numbered to indicate the order of use at the time this example begins, block number 8 indicating the most recently used page. In FIG. 7B, a new page is requested from the shift register system, and the entire contents is shifted clockwise in loop 1 until the desired address is located in page 5. This requires a down shift of three block positions. While the system is reading or writing data from page 5, the I/O position (see FIG. 7C) is decoupled from the rest of the register as shown in FIG. 7C, and the rest of the register contents is shifted counter clockwise in loop 2 as many positions as it had been shifted down (i.e., three). Page 5 is now in the position of the most recently used page, with the rest of the register ordered to correspond.

Now, in FIG. 7D, page 7 is shifted into the I/O block. Shifting the register down two steps places page 7 in the I/O section. Shifting up two positions as in FIG. 7E with the I/O position decoupled reflects the latest change in use. As shown in FIG. 7F, the most recently used page (7) now rests in the I/O position, the next most recently used page (5) is only one shift cycle away, and so on. Page 7 is available without any lost time for shifting, page 5 is available with just one shift, etc. Thus, the blocks are reordered in the order of most recent use. The highest priority blocks are near the bottom while the lowest priority blocks are near the top. It is, of course, possible to "double reorder" bidirectionally such that the lowest priority blocks end up in the middle of the long shift register. In that event block 4 in FIG. 7F would have the lowest priority. The ability of moving blocks of information within the various loops bidirectionally such that the entire structure may be placed on a single semiconductor chip is a unique advantage of using CCD devices in a dynamically ordered bidirectional shift register. In accordance with the present invention, the bidirectional feature being obtained by the mere swapping of clock lines to the three phase shift register shown is a further advantage of the limited stage required for obtaining the bidirectional mode of operation.

Refer again to FIGS. 1, 2 and 3 for a more detailed description of the operation of the present invention. In the section of FIG. 1, three bits of data are shown stored. The various potential "wells" at time equal to *t*1 are shown in dotted lines. The minority carriers previously injected into the first stage of the shift register are shown by the + sign. As shown, therefore, the CCD devices under electrodes 1, 2 and 3 are storing a "0" while the bit position shown under electrodes 4, 5 and 6 store a "1", as does the bit position under electrodes 7, 8 and 9. In CCD devices, this entire potential well together with the particular minority carriers representing the binary data is shifted by one gate electrode during the occurrence of each of clock phase pulse. During a complete cycle in which each of the clock phase pulses has occurred, a bit is completely shifted as from under electrode positions 4, 5 and 6 to under electrode positions 7, 8 and 9. With continued reference to FIG. 1 as well as FIG. 3, it is seen that the clock phase potentials vary from a negative resting voltage (—VR) and a more negative shifting voltage (—VS). The down going section of the pulse is very fast for rapid operation while the up level is slow in order to afford the minority carriers time to move from one position to the next. If phases A, B and C are equated with phases 1, 2 and 3, respectively, then the shift register of FIG. 1 will shift from left to right. In order to shift left, the phase A line is equated with the phase 3 line, the phase C line is equated with the phase 1 line and the phase B line remains equated to the phase 2 line. This is accomplished by the circuit in FIG. 3A in which the phase A line is shown being applied to both AND circuits 31 and 32. The phase C line is similarly connected to the inputs of both AND circuits 31 and 32. If the shift right pulse SR is at an up level during the occurrence of the phase A pulse, then the right hand half of AND circuit 31 will gate the phase A pulse into OR circuit 33, so that the phase A pulse will appear as phase 1. At the same time, since the phase A pulse is applied to the right hand half of AND circuit 32, it cannot be gated into OR circuit 34. Similarly, during phase C time, the up level SR pulse will gate the phase C pulse into OR circuit 34 providing a phase 3 output while the phase C pulse will not be passed by the left hand half of AND circuit 31. The converse is true when the SR pulse is at a down level and the SL pulse is at an up level. In this manner, the SR pulse may remain at an up level at all times when it is desired to shift right while the SL pulse is maintained at an up level of all times when a shift left operation is desired. The shift register of FIG. 1 will also shift left by other combinations of waveform swapping which will be readily apparent to those skilled in the art by appropriate modifications of the clock swapping circuits of FIG. 3A.

Refer now to FIGS. 4, 5 and 6 for a description of the operation pf the amplifying stage. If it is desired to shift right, GA, GB and GC are equated with G1, G2, and G3, respectively. The waveforms of FIG. 3 are reproduced in FIG. 6 to point out the detailed interfacing relationships between the CCD devices and the amplifier stage. Note that the "G" pulses can be derived from the "phase" pulses by a suitable delay. Continuing with the present example of shifting from left to right, a shift right operation, the occurrence of the G1 pulse restores the gate of T2 to a down level, conditioning it to be conductive. (Note that with P channel devices by occurrence of a pulse is meant the occurrence of a negative pulse which conditions the FET into conduction). During G2 time, as illustrated in FIG. 4, the data contained in the last CCD position is transferred to the diffusion D1 which is connected to the gating electrode of T2. This data, depending on whether ir is a "0" or a "1" will either keep the gate potential of T2 at the down level or will cause it to rise to the up level. It should at this point be pointed out that T3 (as well as T6) has a *w/l* ratio so that the output at diffusion D2 will follow the state of T2. Note also that during a shift right operation, T7 is maintained off preventing D1 from being brought to ground potential through T6 during G2 time. Assuming that the input data keeps the gate of T2 at a down level, a down level signal is supplied to diffusion D2 through T8 which is kept on by the down level SL pulse. The subsequent occurrence of the G3 pulse transfers this bit of information to the CCD device under the electrode connected to the G3 terminal in FIG. 4. At the same time, the G3 pulse applied to T3 is not enough to bring D2 to an up level because of the aforementioned *w/l* ratio of T3. If the signal at D1 brought the gate of T2 to an up level turning T2 off, then the occurrence of the G3 pulse would bring D2 to an up level through T8, by current through T3, transferring this up level bit of information to the first CCD device to the right of the amplifying circuit.

If it is desired to shift left, then GA, GB and GC are equated with G1, G3 and G2, respectively. In such an event, the G1 pulse restores the gate of T5 (connected to diffusion D2) during G1 time. The subsequent occurrence of G3 will either maintain T5 at its conductive level or turn it to its off level depending on the nature of the data. The subsequent occurrence of G2 time will then shift the data, which has now passed through conductive T7, from the D1 diffusion into the first CCD device to the left of the amplifying circuit. The swapping of clock lines is accomplished by the circui of FIG. 6A which operates similar to the circuit of FIG. 3A. The operation of AND and OR circuits being well known in the art obviates the need for further explanation of FIG. 6A.

Another feature of the present invention is that the various shifting loops are operable at different frequencies. This is readily accomplished by gating a different frequency of phase pulses to the CCD devices. A significant advantage of shifting certain loops at a slower rate is a power saving. There is no loss in performance because the faster shift rate may be gated to the CCD devices, as required.

Also note that in the dynamic configuration described, it is not possible to keep the data static. However, as in FIG. 7F, for example, the data in FIG. 5 could be made to remain in block 5, if it is recirculating upon itself. Otherwise, as presently shown, the entire loop is shifted back and forth moving block 8 to block 5 while block 5 moves to block 1 and back again.

What has then been described is a dynamically ordered bidirectional dynamic shift register having CCD devices. The combination of dynamic ordering with bidirectional operation enhances access time to shift registers previously unavailable in the art. The use of CCD devices makes bidirectional operation simple and practical and permits extremely high density packaging. Although an example of a three phase shift register has been shown, four phase, etc. shift registers could be designed to operate in the same manner for the same purpose. Accordingly, while the invention has been particularly shown and described with reference to preferred embodiments, it will be understood by those skilled in the art that various changes in form and detail may be made therein without departing from the spirit and scope of the invention.

What is claimed is:

1. A charge coupled device shift register formed in a semiconductor substrate comprising:

a plurality of charge coupled shift register bit positions arranged in a series bit stream formed in the semiconductor substrate, and responsive to a source of clock pulses for shifting data bits in a first of two possible directions;

first means connected between said source of clock pulses and said plurality of charge coupled shift register bit positions, responsive to said source of clock pulses and also responsive to one of two mutually exclusive shift direction pulses for selectively altering the order of occurrence of said clock pulses, thereby changing the direction of shifting said series bit stream;

bidirectional amplifying means integral with said same semiconductor substrate electrically connected in the series bit stream, for amplifying the data bits, and responsive to a source of gating pulses for amplifying data bits being shifted in a first of two possible directions;

second means connected between said source of gating pulses and said bidirectional amplifying means, responsive to said source of gating pulses and also responsive to the same one of said two mutally exclusive shift direction pulses for selectively altering the order of occurrence of said gating pulses, thereby amplifying data bits in the same direction as shifted in the series bit stream.

2. A charge coupled device shift register as in claim 1 wherein said first means comprises:

a plurality of gating circuits responsive to at least two of said plurality of clock pulses and also reponsive to the one of two mutally exclusive shift direction pulses for interchaning the time of occurrence of said at least two of said plurality of clock pulses.

3. A charge coupled device shift register as in claim 1 wherein said second means comprises:

a plurality of gating circuits responsive to at least two of said plurality of gating pulses and also responsive to the one of two mutually exclusive shift direction pulses for interchanging the time of occurrence of said at least two of said plurality of gating pulses.

4. A bidirectional CCD shift register system having a dynamic ordering capability for storing electronic data and for rapid accessing of sad data, including at least two sections of operatively interconnected shft register blocks, the first one of said sections having a large number of shift register blocks for storing the bulk of said data, the second one of said at least two sections having a disparately small number of shift register blocks for storing high priority data, each of said shift register blocks comprising;

a plurality of charge coupled shift register bit positions arranged in a series bit stream formed in a semiconductor substrate, and responsive to a source of clock pulses providing a plurality of clock pulses for shifting data bits in a first of two possible directions;

first means connected between said source of clock pulses and said plurality of charge coupled shift register bit positions, responsive to said source of clock pulses and also responsive to one of two mutually exclusive shift direction pulses for selectively altering the time of occurrence of said clock pulses, thereby changing the direction of shifting said data bits;

bidirectional amplifying means integral with said same semiconductor substrate electrically connected in the series bit stream, for amplifying the data bits;

a source of gating pulses;

second means connected between said source of gating pulses and said bidirectional amplifying means, responsive to said source of gating pulses and also responsive to the same one of said two mutually exclusive shift direction pulses for selectively altering the time occurrence of said gating pulses, thereby amplifying data bits in the same direction as shifted in the series bit stream, independently in each of said at least two sections of operatively interconnected shift register blocks.

5. A bidirectional charge coupled device shift register system as in claim 4 wherein said first means comprises;

a plurality of gating circuits responsive to at least two of said plurality of clock pulses and also responsive to the one of two mutually exclusive shift direction pulses for interchanging the time of occurrence of said at least two of said plurality of clock pulses.

6. A charge coupled device shift register system as in claim 4 wherein said second means comprises;

a plurality of gating circuits responsive to at least two of said plurality of gating pulses and also responsive to the one of two mutually exclusive shift direction pulses for interchanging the time of occurrence of said at least two of said plurality of gating pulses.

* * * * *

PO-1050
(5/69)

UNITED STATES PATENT OFFICE
CERTIFICATE OF CORRECTION

Patent No. 3,789,247 Dated January 29, 1974

Inventor(s) William F. Beausoleil, Irving T. Ho, Hwa Nien Yu

It is certified that error appears in the above-identified patent and that said Letters Patent are hereby corrected as shown below:

| | |
|---|---|
| Column 4, Line 46 | "term" should be --item-- |
| Column 5, Line 14 | "meas" should be --means-- |
| Column 7, Line 37 | "ir" to --it-- |
| Column 8, Line 2 | "circui" should be --circuit-- |

Signed and sealed this 19th day of November 1974.

(SEAL)
Attest:

McCOY M. GIBSON JR.
Attesting Officer

C. MARSHALL DANN
Commissioner of Patents